(12) United States Patent
Berdahl

(10) Patent No.: US 7,073,866 B1
(45) Date of Patent: Jul. 11, 2006

(54) CHILD SAFETY HARNESS

(76) Inventor: Sonja Esther Berdahl, 3585 S. Oneida Way, Denver, CO (US) 80237

( * ) Notice: Subject to any disclaimer, the term of this patent is extended or adjusted under 35 U.S.C. 154(b) by 0 days.

(21) Appl. No.: 10/784,520

(22) Filed: Feb. 23, 2004

(51) Int. Cl.
*A47D 13/08* (2006.01)

(52) U.S. Cl. .................................... 297/485; 297/484

(58) Field of Classification Search ............. 297/485, 297/484; 2/44, 912; 128/99.1, 100.1, 101.1; 182/3, 5–7
See application file for complete search history.

(56) References Cited

U.S. PATENT DOCUMENTS

| | | | | |
|---|---|---|---|---|
| 293,799 | A | * | 2/1884 | Simkin .......................... 182/4 |
| 1,310,958 | A | * | 7/1919 | O'Connor .................... 297/484 |
| 1,574,672 | A | * | 2/1926 | McCarroll-Doull ......... 128/875 |
| 2,212,746 | A | * | 8/1940 | Nelson ........................ 119/770 |
| 3,936,092 | A | | 2/1976 | Dietz |
| 4,050,737 | A | | 9/1977 | Jordan |
| 4,235,474 | A | | 11/1980 | Rosenberg |
| 4,308,629 | A | * | 1/1982 | Freemon ...................... 119/770 |
| 4,667,624 | A | * | 5/1987 | Smith .......................... 119/770 |
| 4,702,523 | A | | 10/1987 | Schrader |
| D300,474 | S | * | 3/1989 | Caulder et al. ......... D29/101.1 |
| D300,475 | S | * | 3/1989 | Caulder et al. ......... D29/101.1 |
| 4,861,109 | A | | 8/1989 | Leach |
| 4,867,464 | A | * | 9/1989 | Cook ..................... 280/33.993 |
| 4,927,211 | A | | 5/1990 | Bolcerek |
| 5,119,767 | A | | 6/1992 | Jimenez |
| 5,325,818 | A | * | 7/1994 | Leach ............................ 182/3 |
| 5,388,551 | A | | 2/1995 | Martusciello |
| D374,506 | S | * | 10/1996 | O'Neil ..................... D29/101.1 |
| 5,664,844 | A | * | 9/1997 | Greene ....................... 297/485 |
| 5,676,426 | A | | 10/1997 | Herring |
| 5,733,014 | A | * | 3/1998 | Murray ....................... 297/485 |
| 5,915,789 | A | * | 6/1999 | Ponce De Leon, III ..... 297/484 |
| 5,927,235 | A | * | 7/1999 | Olaiz ............................ 182/3 |
| 6,009,839 | A | | 1/2000 | Kohn |
| 6,095,613 | A | | 8/2000 | Ostrander |
| 6,254,184 | B1 | | 7/2001 | Kontos |
| 6,390,345 | B1 | | 5/2002 | Brown |

FOREIGN PATENT DOCUMENTS

DE 3532011 A1 * 3/1987
GB 1314321 4/1973

* cited by examiner

*Primary Examiner*—Peter R. Brown
(74) *Attorney, Agent, or Firm*—Timothy J. Martin; Michael R. Henson

(57) ABSTRACT

A fully adjustable universal safety harness or restraint for small children designed to secure them in various chairs, high chairs, booster seats, shopping carts or strollers, or to control their movement. The restraint comprises a harness which fits over the child's shoulders and around the chest and waist and includes a separate strap, swivel hooks, belt loops, and several D rings.

5 Claims, 12 Drawing Sheets

CHILD SAFETY HARNESS

BACKGROUND

1. Field of Invention

The field of the invention is the field of safety harnesses to restrain young children, particularly toddlers, which are used to insure that a child does not accidentally fall from a chair, high chair, shopping cart, stroller, etc.

2. Description of Prior Art

Over the years there have been numerous devices, some awkward and complex, for preventing children from falling from chairs, strollers, etc. Many of these devices are complex in structure and costly to manufacture, and are not easily adapted to a number of situations to prevent a child from falling.

Representative of prior art are the following U.S. patents. U.S. Pat. No. 6,009,839, Jan. 4, 2000, to K. M. Kohn discloses a child restraint harness system securable around the legs and shoulders of the child and including a semi-rigid child seat frame with harness retention clips. U.S. Pat. No. 5,388,551, Feb. 14, 1995, to J. Martusciello, discloses a convertible harness system for a child typically involving a seat element which extends between the legs of the child. U.S. Pat. No. 4,861,109, Aug. 29, 1989, to J. S. Leach discloses a T-shaped body restraint device designed to secure a toddler in a chair. These and similar patents involve restraints with numerous or special parts, and the restraints are not flexible enough to be used in a wide variety of seats such as chairs, strollers, shopping carts, etc.

SUMMARY OF INVENTION

The invention is a flexible, universal safety harness or restraint for children, especially toddlers. It is a fully adjustable restraint that will secure children of varying sizes to any type of high chair, booster seat, adult chair, shopping cart, wheelchair or stroller. It involves a detachable adjustable strap which can also be used as a safety tether for extra security when the adult is walking with the child, for example in a crowded public place, along a busy street, etc. in order to be sure that the child does not run away from the parent and into an unsafe situation. The invention is essentially a safety harness which fits over the shoulders and the back and chest of a child and is fitted with a detachable and adjustable strap with two swivel snap hooks and a D ring, three belt loops, and five additional D rings. Different versions of the invention could involve the basic harness with different numbers of straps, belt loops and D rings, etc. The harness can be used with an additional strap that hooks on the front and lower back D rings to create a leg strap that would prevent children with Houdini-like escape skills from sliding out of the harness. The between-the-leg strap may be required for use on airplanes; however, this has not been confirmed with the FAA.

OBJECTS AND ADVANTAGES

The objects and advantages of the present invention are:

1. To provide a device which prevents the child from standing in and falling from a high chair, booster seats, adult chair, shopping cart, or stroller.
2. To provide a device which provides a high degree of security to ensure that the child does not fall from one of the above.
3. To provide a device which is fully and quickly adjustable to the size of the child.
4. To provide a device which includes an adjustable strap which can be used also as a safety tether for extra security when walking with a child.
5. To provide a device which can be quickly, easily, and inexpensively fabricated from common materials such as quilted cotton, and hook and loop closures but without bulky hardware or buttons.
6. To provide a device which slips on the child and fastens very quickly and feels like clothing in order to provide maximum comfort to the child.
7. To provide a device which can be easily put on the child before going out and which fits like clothing and can be worn either under or over a coat.
8. To provide a device which will not interfere with a car seat or stroller or the straps on either.
9. To provide a device which is durable, machine washable, and strong enough restrain even the most active child.
10. To provide a device which can be used on an airplane to secure a child to an adult's lap belt on the airplane seat.
11. To provide a device which does not involve complicated metal or other parts.
12. To provide a device which is readily assembled from commonly available mechanical parts.
13. To provide a device which is small, light weight, and self-contained, making it convenient for parents traveling with toddlers.
14. To provide a device which has multiple uses and can function safely in a variety of situations and with a variety of child equipment such as highchairs, booster seats, strollers, shopping carts, etc. and can be used as a walking tether replacing the need to purchase multiple products.

DRAWING FIGURES

In the Figures, objects depicted with broken lines are generally objects with which the harness of the Application is used. The Application makes no claim for the structure of the objects, such as chairs or strollers, etc., with which the harness is used, and they are prior art.

FIG. 1 shows the harness in position for use in a high chair, which is shown in broken lines. The adjustable strap 8 is shown in position under the seat of the high chair.

FIG. 2 shows the harness in position for use with a booster chair placed in the seat of a chair. The adjustable strap 8 is shown securing the harness to the frame of the chair. The strap is looped around the outer spoke on each side and then clipped to the two side D rings 4.

FIG. 3 shows the harness in position in a regular chair with adjustable strap 8 secured around the back of the vertical portion of the chair.

FIG. 4 shows the harness in position in the child's seat area at the back of a typical grocery store shopping cart. The adjustable strap 8 is positioned through belt loops in the front and two sides of the harness and then extends around the vertical wire members comprising the back of the shopping cart child seat area. The adjustable strap 8 can be secured to the shopping cart frame in the same way as shown in FIG. 2, or extended around the back of the shopping cart seat as shown in FIG. 3.

Figure 7:
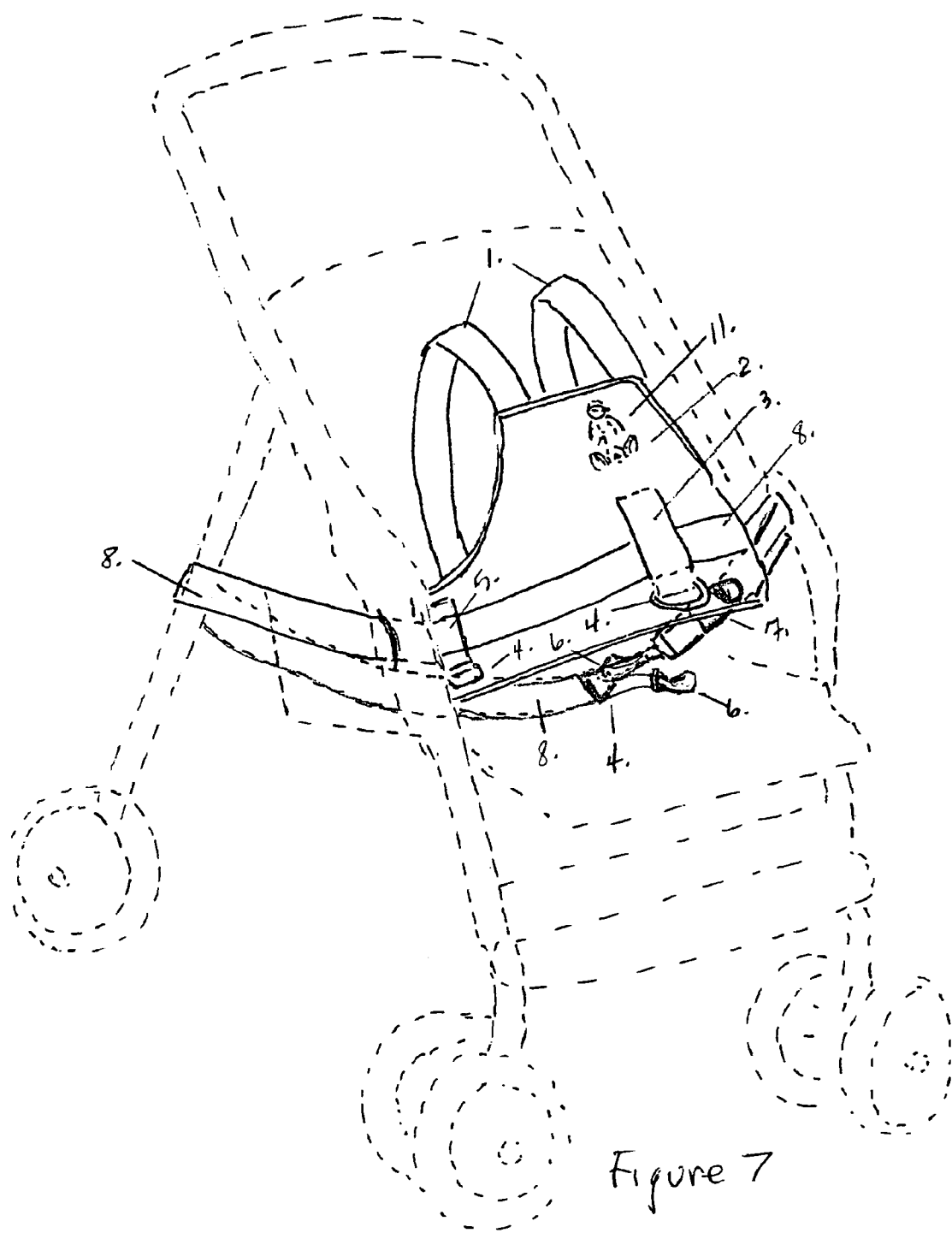

FIG. 7 shows the harness in position attached to a typical child stroller. The adjustable strap 8 is secured through front and side belt loops 3 and 5 on the harness and then around the back of the stroller, with the two ends of the adjustable strap 8 being connected by means of a swivel snap hook 6 and an attached D ring 4. FIG. 7 is just one example of how the harness could be used with a stroller. There are numerous ways to secure a child to a stroller depending on the design of the stroller.

Figure 8:
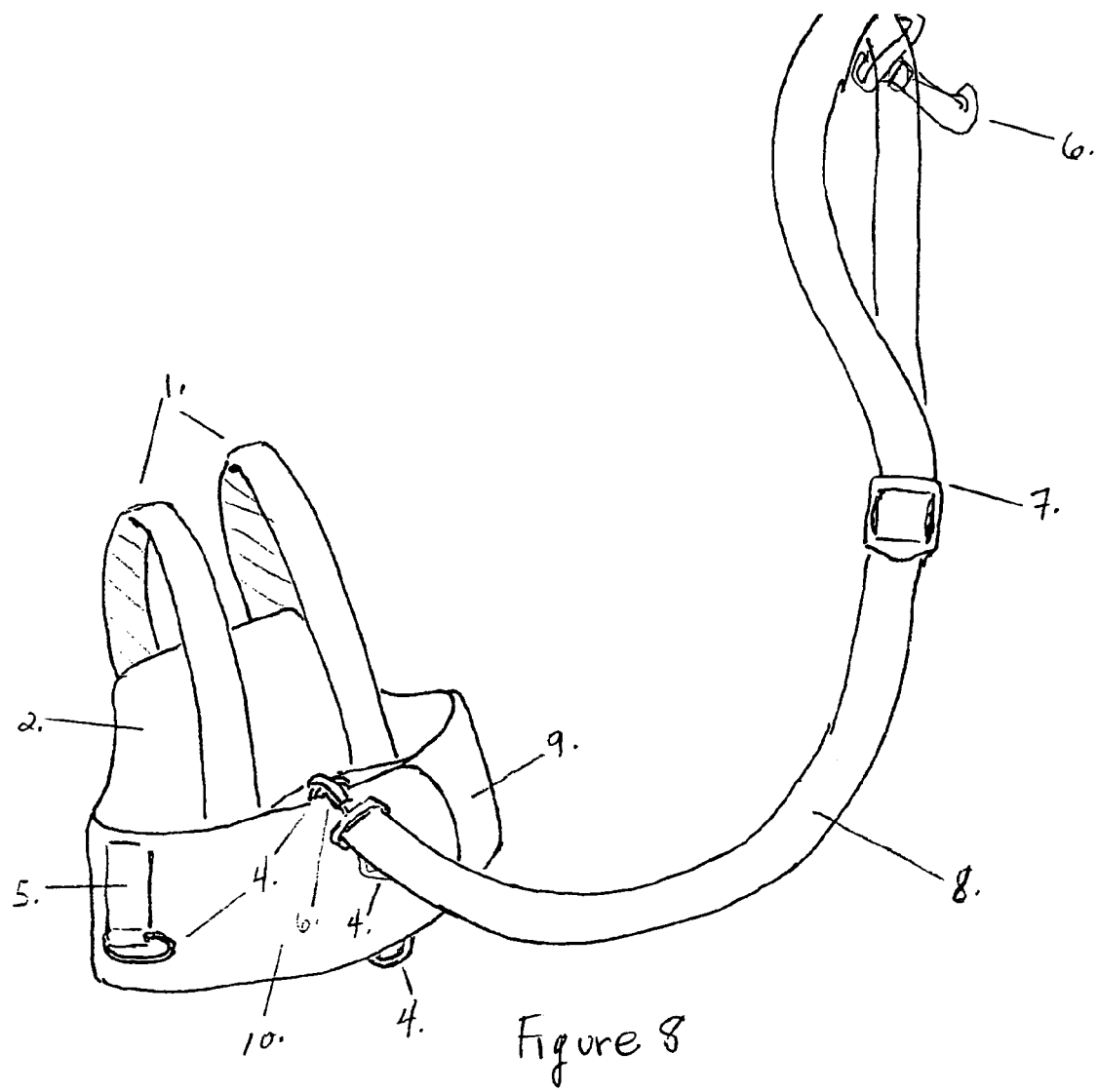

FIG. 8 shows the harness with right and left back waist pieces 9 and 10 overlapped and secured by hook and loop closures (not shown between the overlapping waist pieces). The adjustable strap 8 is shown in use as a tether connected to the overlapping waist pieces 9 and 10 by clipping one end of the strap 8 to the upper back D ring 4. The 6 other end of strap 8 is adjusted to form a loop through which the hand of an adult can be placed and used to control the child while the child and adult are walking together.

Figure 9:
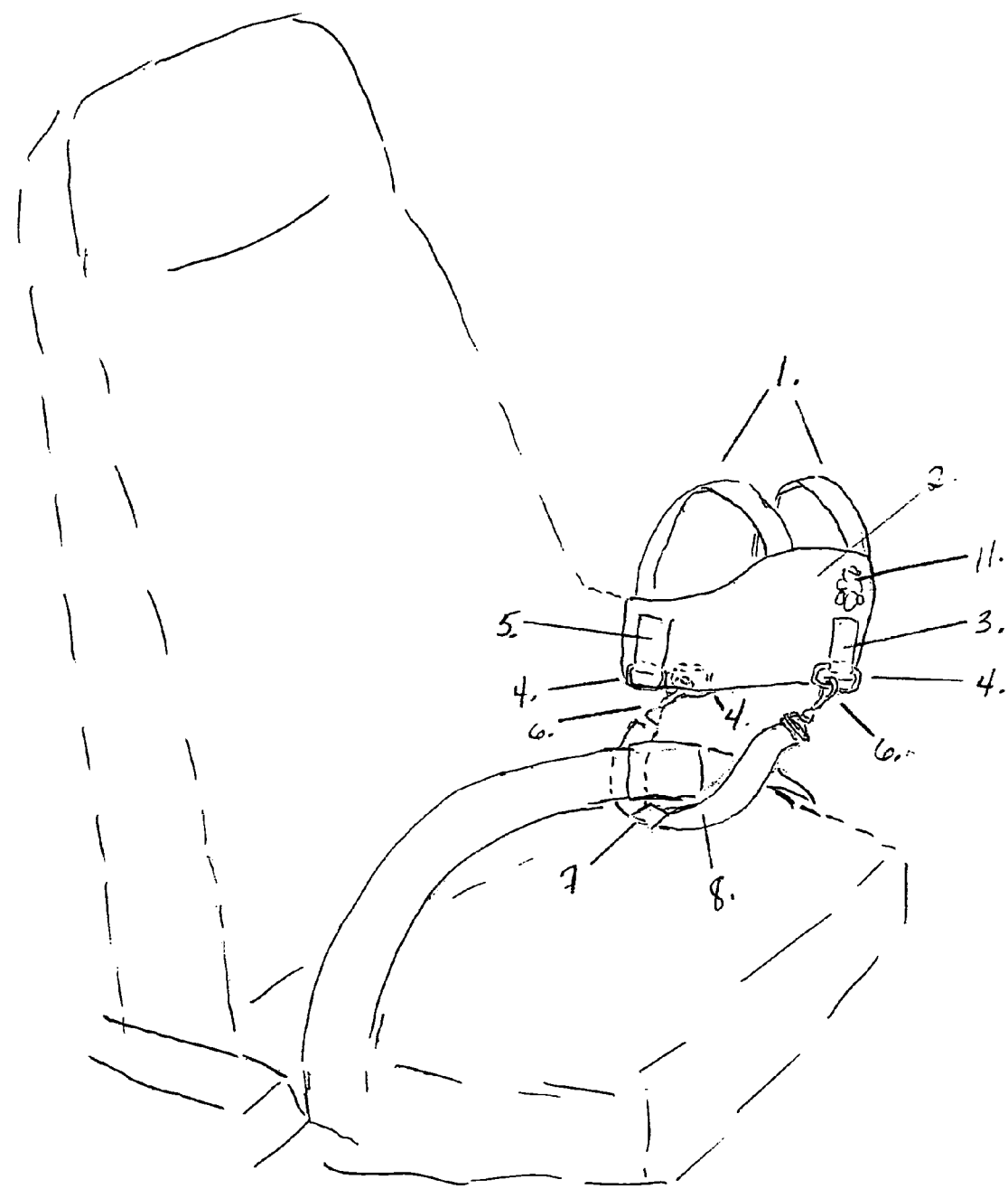

FIG. 9 depicts the harness in use on an airplane. An adult would be seated in the airline seat with the lap belt secured and with the child positioned on the adult's lap. The adjustable strap 8 is hooked to the front D ring 4, positioned between the child's legs and under the adult lap belt and then hooked to the back lower D ring 4 on the harness. This will prevent a child from bouncing up if the airplane experiences severe turbulence.

Figure 10:
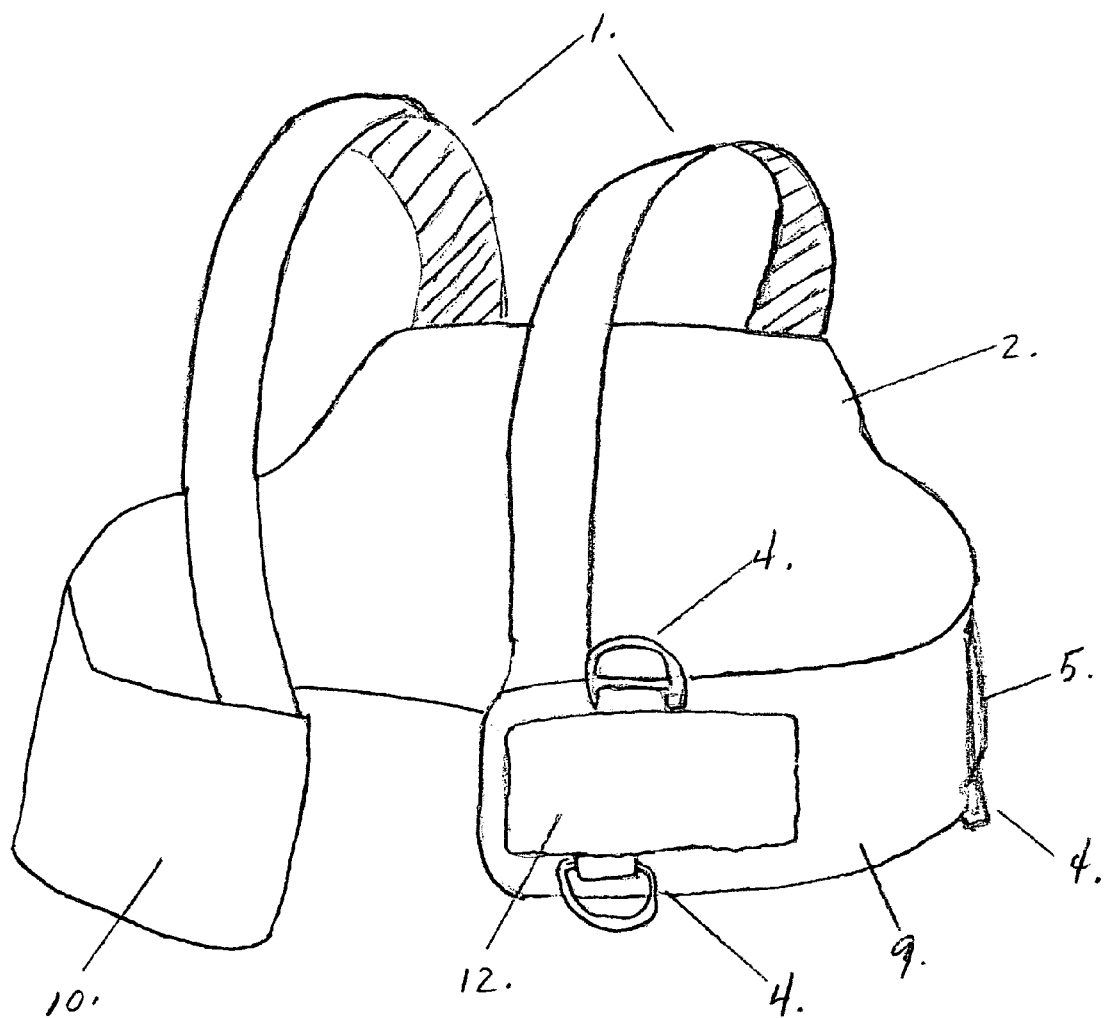

FIG. 10 is a back view of the harness that shows the upper and lower back D rings 4 and the hook portion of the hook and loop closure 12. The loop portion of the hook and loop closure is attached to the back of the left back waist piece 10 (not shown).

Figure 11:
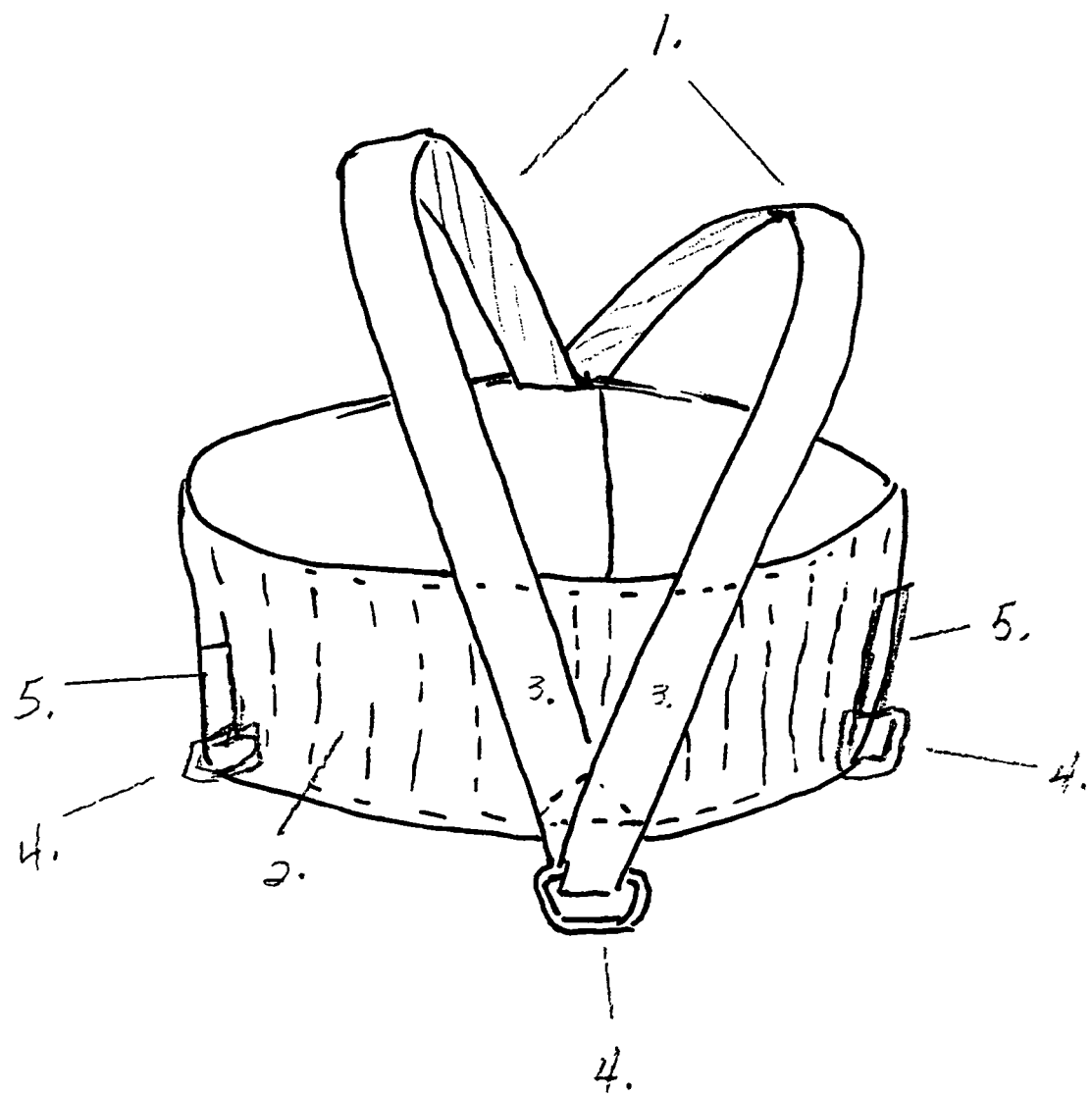

FIG. 11 shows how the shoulder straps 1 can come together in a V shape to form another belt loop 3 between the points where the straps are attached to the waist piece 2 at two points, typically by stitching.

Figure 12:
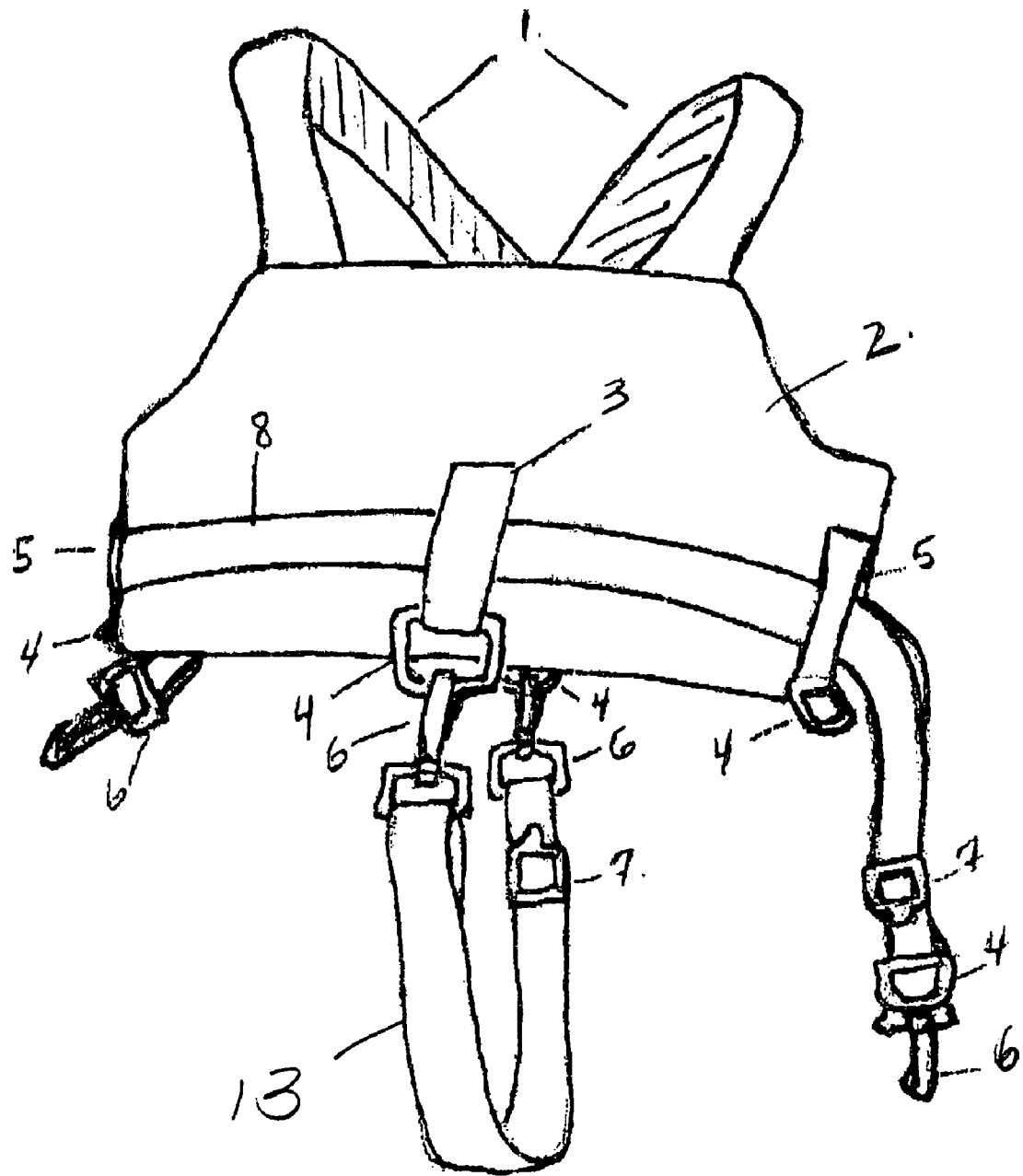

FIG. 12 shows the leg strap 13 attached to the harness and positioned to go between the legs of the child or disabled person. The leg strap 13 is typically a shorter version of adjustable strap 8, and preferably including a strap adjuster 7.

REFERENCE NUMERALS IN DRAWINGS 1. shoulder straps
2. waist piece
3. front belt loop
4. D ring
5. side belt loop
6. swivel snap hook
7. strap adjuster
8. adjustable strap
9. right back waist piece portion
10. left back waist piece portion
11. ornamental design or picture
12. hook and loop closure strip
13. leg strap

DETAILED DESCRIPTION OF THE DRAWINGS

Figure 1:
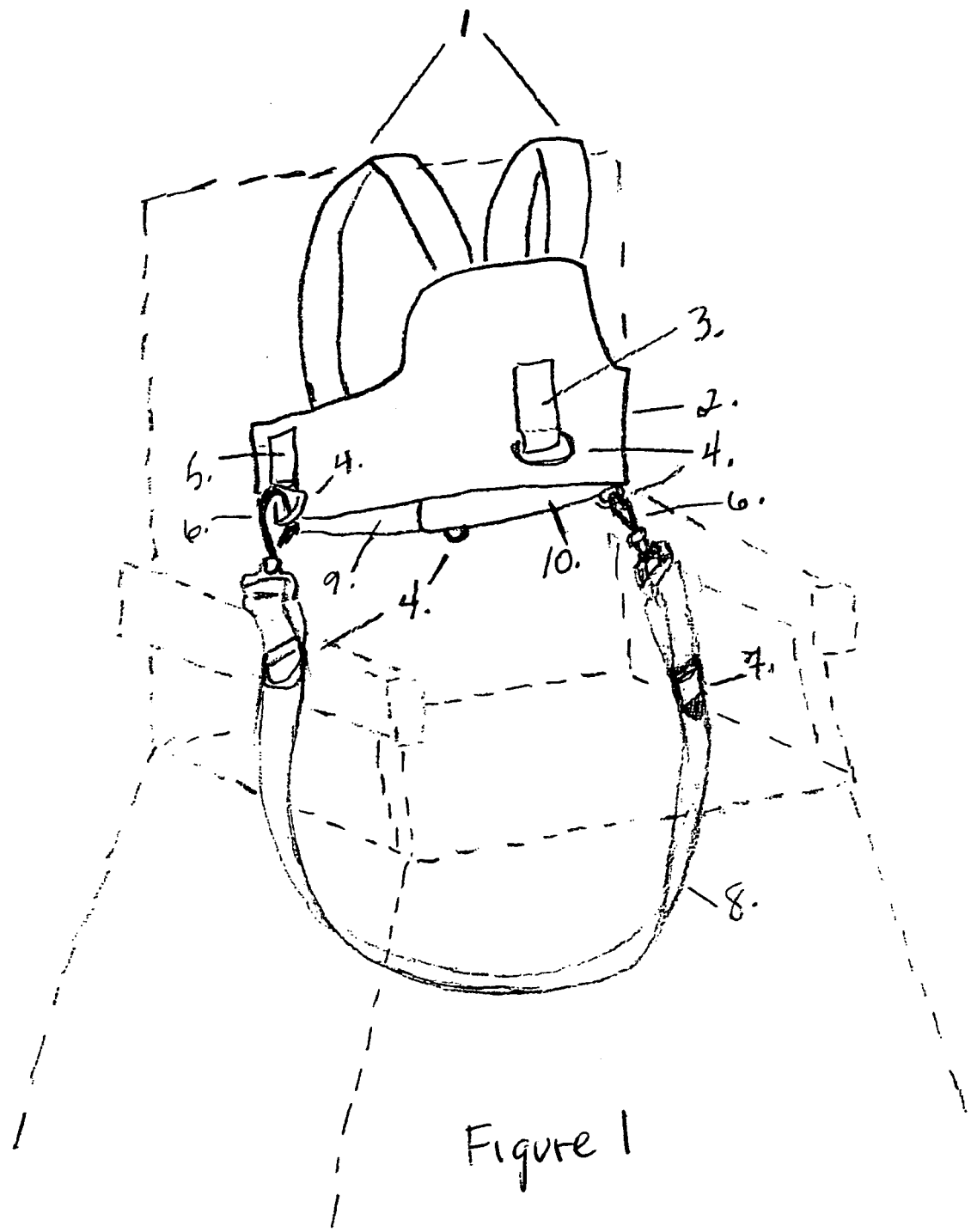

FIG. 1 shows the harness (comprised of the two shoulder straps 1 and waist piece 2) and adjustable strap 8 positioned so that the strap is attached to the harness and passes under the seat of the high chair shown in broken lines. The Figure shows two shoulder straps 1, the waist piece 2, the front belt loop 3, a side belt loop 5, two swivel snap hooks 6 attached to two D rings 4, and three D rings 4 attached at the bottom of each belt loop 5 and one D ring 4 attached to the adjustable strap 8. Also shown are strap adjuster 7, and right and left back waist piece portions 9 and 10. Strap adjuster 7 comprises a sliding buckle, known to those skilled in the art, through which the adjustable strap 8 is connected on one end.

Figure 2:
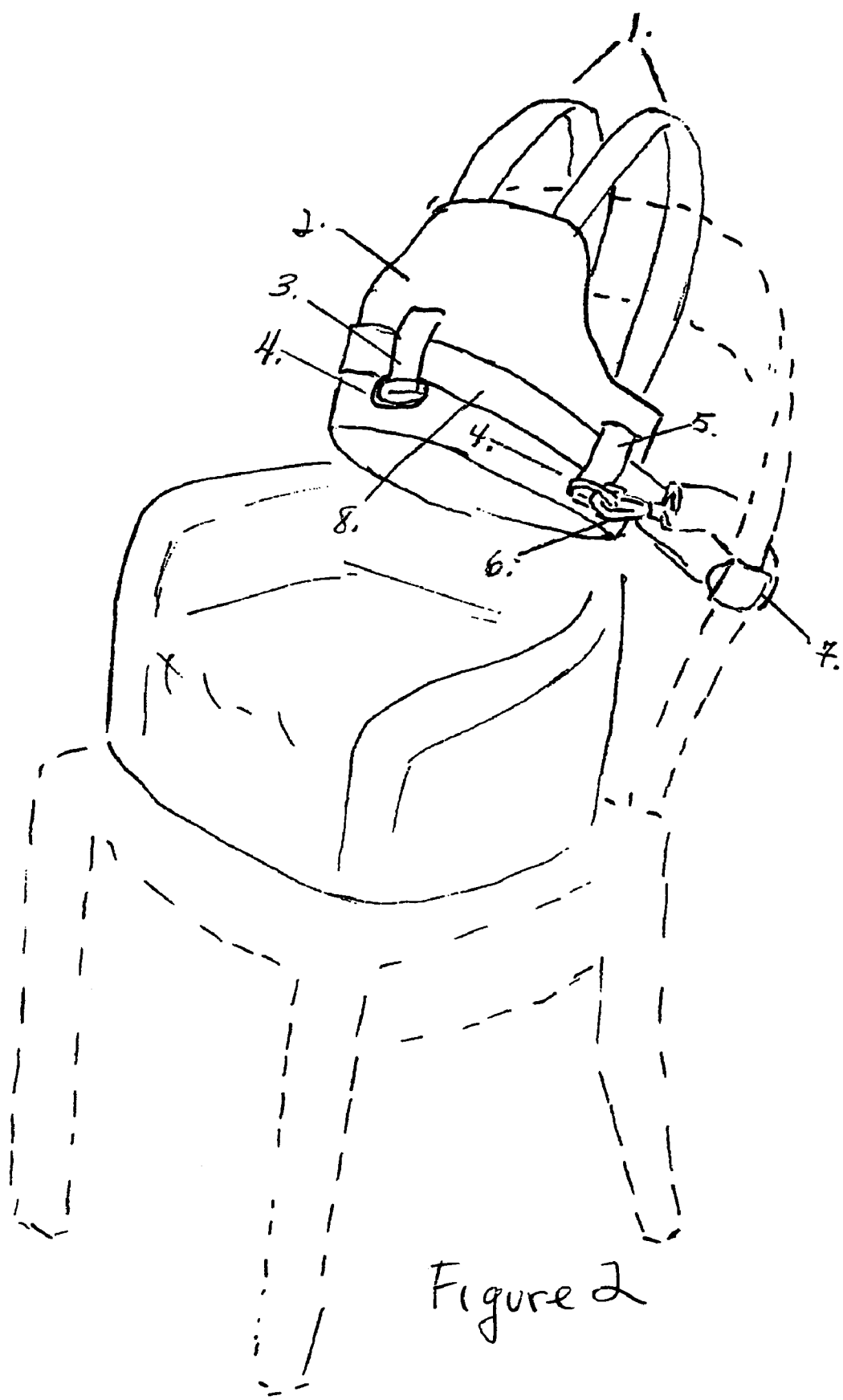
Figure 5:
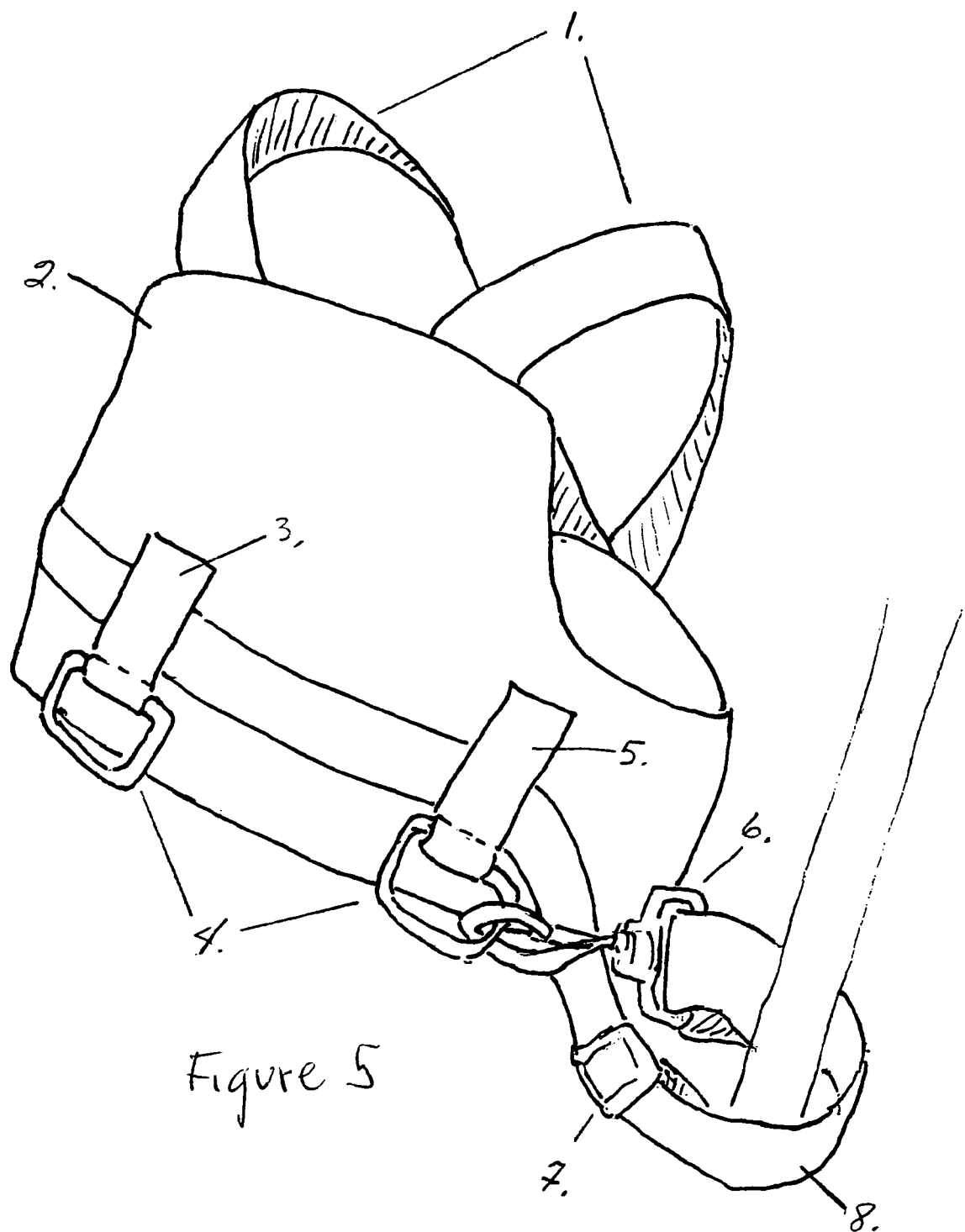
FIG. 5 is a closer view of the adjustable strap 8 attached to the frame of a chair, stroller, or shopping cart.

FIG. 2 shows the harness in position for use with a booster seat placed in the seat of a chair. In this configuration, adjustable strap 8 is positioned through front belt loop 3, side belt loop 5 and another side belt loop (not shown) and then wrapped around a back chair rung and attached by means of swivel snap hook 6 to a D ring 4 attached at the bottom of side belt loop 5. The adjustable strap 8 is attached to the other side of the chair in the same manner (not shown). A closer view of this method of securing the harness is shown in FIG. 5.

Figure 3:
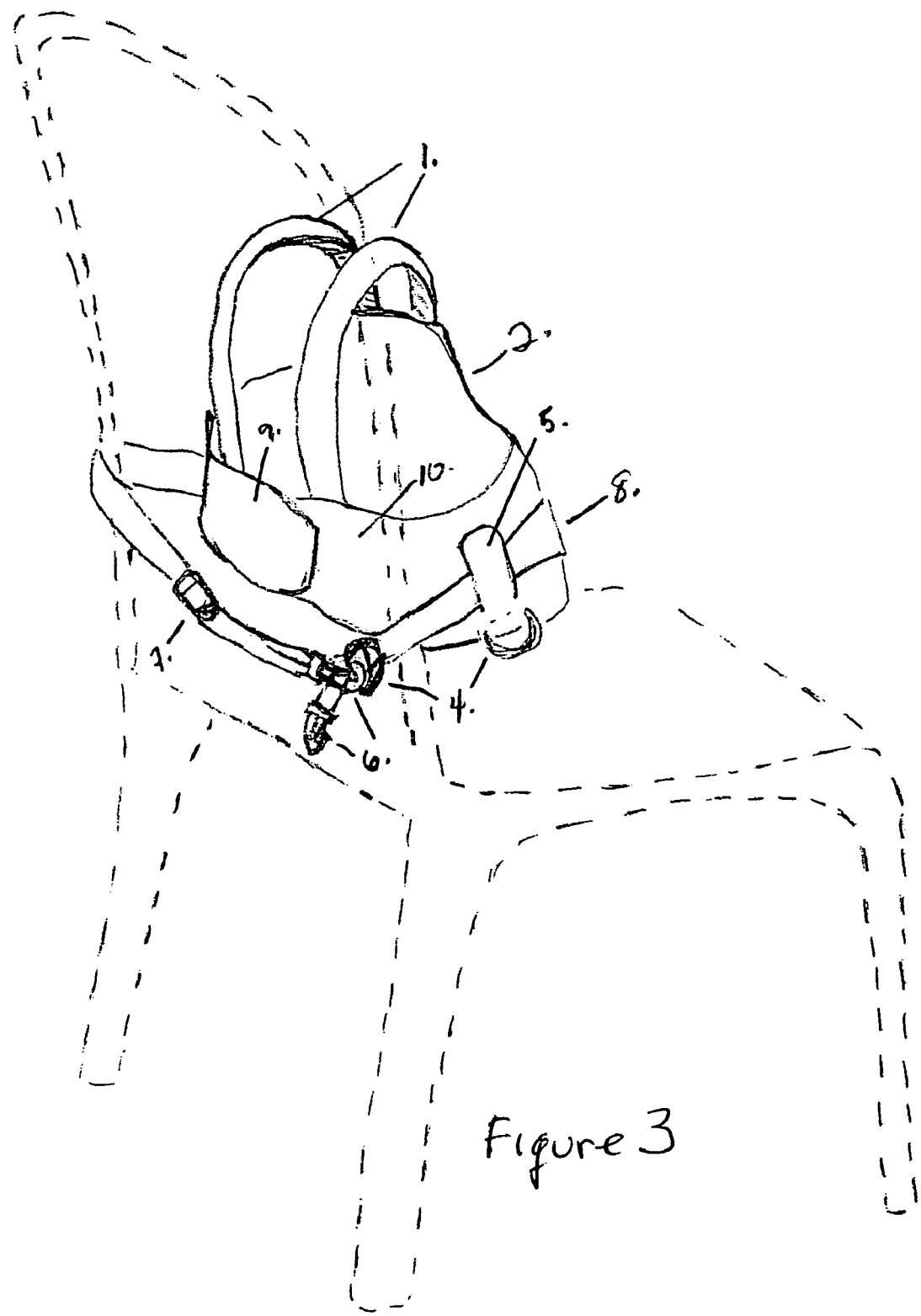
Figure 6:
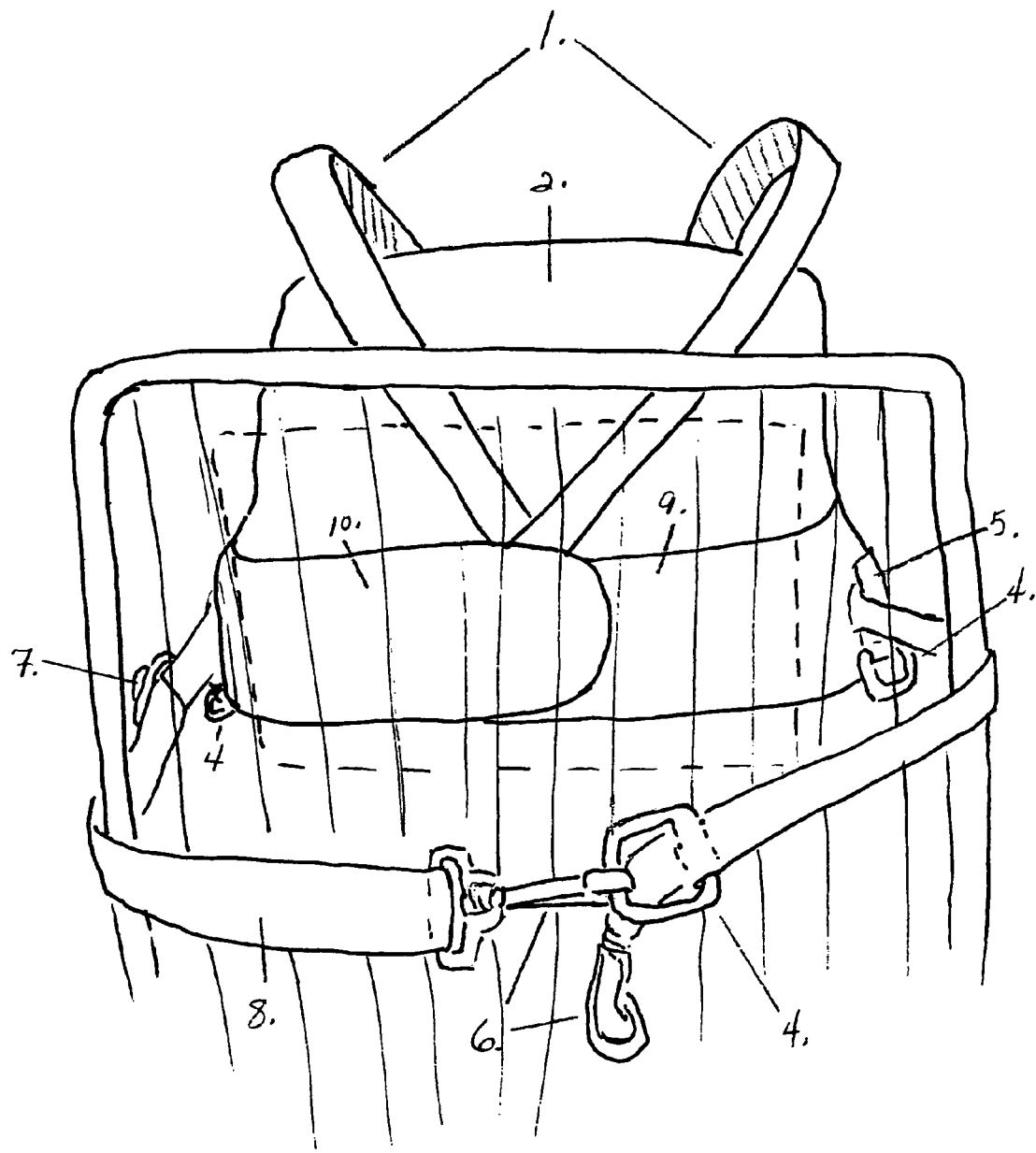
FIG. 6 is a closer view of the adjustable strap 8 wrapped around the back of a shopping cart and secured to the attached D ring 4.

FIG. 3 is similar to FIG. 2 except there is no booster seat and adjustable strap 8 is wrapped around the back of the chair, shown in broken lines, and then attached by swivel snap hook 6 to the D ring 4 on adjustable strap 8. A closer view of this method of securing the harness is shown in FIG. 6.

Figure 4:
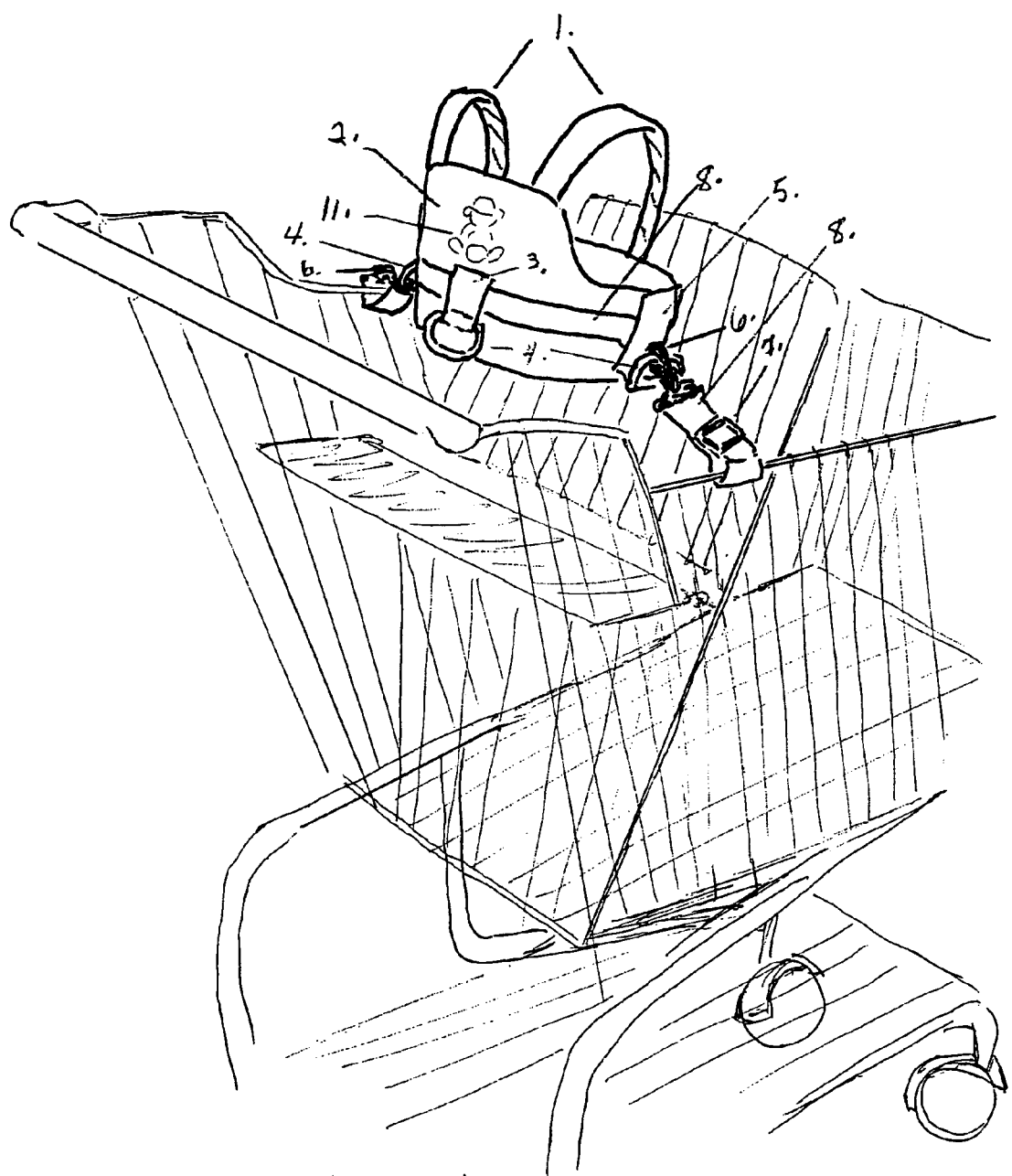

FIG. 4 shows the harness in position in the child seat portion of a typical shopping cart. In this configuration, the child typically faces the back of the cart and its legs extend through openings in the upper back portion of the shopping cart. To prevent the child from standing up in the shopping cart seat area, adjustable strap 8 is positioned through front belt loop 3 and two side belt loops 5 and then around the horizontal side bars of the child seat area. The two ends of adjustable strap 8 are connected by means of swivel snap hooks 6 to D rings attached at the bottom of side belt loops 5.

FIG. 7 shows the harness in position on a typical child stroller. Adjustable strap 8 passes through front belt loop 3 and two side belt loops 5 (one of which is not shown) and then passes around the back of the stroller frame. The two ends of adjustable strap 8 are secured to each other by swivel snap hook 6 and the D ring 4 on the adjustable strap 8 as shown in FIG. 6. An optional ornamental design or picture 11 may be used.

FIG. 8 shows the adjustable strap 8 used as a safety tether to keep the child close to an adult. The adjustable strap 8 is attached to the upper D ring attached to the left back waist piece 10, which is overlapped with right back waist piece 9. The adult's hand is positioned through a loop formed at the end of adjustable strap 8. The loop is formed at the end of strap 8 by the strap adjuster 7.

FIG. 9 shows the harness in use on airplane. The passenger seat is represented by the dotted lines. An adult (not shown) would be belted into the airplane seat with the child seated on her lap. Adjustable strap 8 is shortened using the strap adjuster 7 and attached to the front D ring 4. The adjustable strap 8 is placed between the child's legs and under the adult lap belt, and then attached to the lower back D ring 4.

FIG. 10 shows the upper and lower back D rings 4. FIGS. 11 and 12 are discussed above.

DESCRIPTION—PREFERRED EMBODIMENT

The preferred embodiment of the invention of the Application comprises a harness comprising a pair of shoulder straps 1 and a waist piece 2, where the shoulder straps go over the shoulders of the child to be restrained, and the waist piece extends from the abdomen of the child around the sides of the child and is closed by overlapping of the right and left portions of the back waist pieces 9 and 10. The preferred embodiment for overlapping and securing the two portions is mating hook and loop pairs 12. Other waist piece securing means can be used. The preferred parts for securing the harness to the chair, stroller, etc. include a waist piece attachment means, including several belt loops 3 and 5 attached to the waist piece 2 and D rings 4 attached at several points on the waist piece including the bottom of the belt loops. An adjustable strap 8, approximately 50 inches long fitted with a snap hook or swivel snap hook 6 at each end (or other strap attachment means such as mating hook and loop pieces, snaps, or buckles), and a strap adjuster 7 (which could comprise a slip buckle through which the adjustable strap 8 can move and to which one end of the adjustable strap 8 is attached, or similar strap adjuster means known to those skilled in the art) and D ring 4, are attached through the belt loops on the waist piece or to the D rings 4 on the waist piece 2 and then securely positioned around some portion of the chair or stroller etc. to which the harness is to be attached. The shoulder straps, waist piece, belt loops, and adjustable strap can be made of woven cotton or artificial fiber fabric. Artificial fiber may in some cases be stronger and more durable and more stain resistant. The cotton or artificial fiber material is assembled by standard fabric stitching techniques, known to those skilled in the art. When the child is walking with an adult, the adjustable strap may be configured with a loop at one end, or other gripping means, which the adult can hold, and attached at the other end to the waist piece of the harness.

OPERATION OF THE INVENTION

FIGS. 1 through 8 show how the harness is attached to chairs, strollers, shopping carts etc., and they show how the adjustable strap 8 can be positioned in various ways with respect to the chair, etc. and how the adjustable strap 8 can be looped around various portions of the chair etc. and attached to the harness by means of belt loops 3 and 5, D rings 4, and swivel snap hooks 6. For high chairs, the adjustable strap 8 is clipped to one of the side D rings 4, looped loosely under the seat and clipped at the other end to the D ring 4 on the other side of the harness. This allows the child to wiggle, but not stand up. See FIG. 1. The harness could also be secured to the high chair in other ways, depending on the style, make and model of the high chair.

For booster seats, the seat may be chair-like or simply a large book. The booster seat is placed in the seat of an ordinary chair. The harness is attached to the back of the chair. The adjustable strap 8 is slipped through all three belt loops 3 and 5, and then both ends of the adjustable strap 8 are looped around a chair spoke, and then hooked, by means of snap hooks or swivel snap hooks 6, to side D rings 4 on the waist piece 2. See FIGS. 2 and 5. Alternatively, the adjustable strap 8 can be placed through all three belt loops including 3 and 5, and then around the back of the chair, and one swivel snap hook 6 is attached to the D ring 4 on the adjuster strap 8. See FIGS. 3 and 6.

For shopping carts, as shown in FIG. 4, the strap 8 is placed through all three belt loops, and then each end of the strap 8 is looped around the edge or spokes of the cart, or through the back of the baby seat of the cart. The adjustable strap 8 can be secured as shown in FIGS. 5 and 6.

For strollers, as shown in FIG. 7, depending on stroller design, the adjustable strap 8, after passing through the three belt loops 3 and 5, can be attached to the back of the seat or the stroller frame, or can be looped under the seat. The attachment is made by using the swivel snap hooks 6 and D rings 4, as shown in FIGS. 1, 5, and 6.

FIG. 8 shows the adjustable strap 8 used as a tether. The extended adjustable strap 8 is clipped at one end to the upper D ring 4 on the back of the harness. The other end of the strap is held in the adult's hand or around the wrist.

FIG. 9 shows the harness and toddler secured to an airplane lap belt. One swivel snap hook 6 is snapped to the front D ring 4, the adjustable strap 8 goes between the child's legs, then through the adult's lap belt and is then clipped with the swivel snap hook 6 to the lower back D ring 4. FIG. 12 shows the leg strap attached to the waist piece 2 and adapted to go between the legs of the child or disabled person, and adjusted by means of strap adjuster 7.

Tests

When the Inventor's son was about 14 months old, he started to stand up in his high chair and refused to sit down. The Inventor spent the entire meal trying to keep him seated. A friend's son was able to squirm out of the high chair straps too and was constantly standing in his chair. The Inventor realized that all that the child needed was a loose strap under the chair that would keep him from standing. So the Inventor stitched up a little harness and strap. It worked well for securing the child to a high chair.

The Inventor's 2 year-old daughter had graduated from the high chair to a booster seat. She would slide out from the booster seat onto the floor or just refuse to stay in it for the entire meal. By adding a few additional features, the harness could be used to secure a young child on just about any style of adult chair, stroller or shopping cart, and could also be used as a walking tether, which is very useful when traveling with young children.

To develop a multi-purpose device, the Inventor added a variety of belt loops and D rings to the harness as well as to the strap. The configuration of the loops and D rings allows the harness to be attached in a variety of ways and to almost any type of chair, stroller or shopping cart. The strap was made adjustable so that it could be used in many different ways, and on just about any size of chair. The device is practical because it is easy to get on and off the child, the size is adjustable, and it is comfortable, washable and attractive enough to put on any child.

To test the idea, the Inventor made 10 harnesses and had them tested with children under the age of 3. The feedback was very positive. Most of the parents who tested the design had a child that would not stay seated, and all of them said it worked very well. They used the device in a variety of situations including high chairs, strollers, shopping carts, etc. One of the mothers who tested the invention is a pediatric occupational therapist with three children ages 3 and under. The Inventor specifically asked her to evaluate it for safety. She was impressed by how well it worked and could see no obvious safety issues.

The invention of the Application is primarily designed for children ages 10 months to 3 years, and weighing approximately 20 to 35 pounds, although other versions could be sized for larger children or adults, especially disabled adults. The back waist pieces overlap and are secured in many positions by hook and loop pairs, depending on the size of the child. The device should be used for children who can sit up on their own. It is not appropriate for use alone in any type of moving vehicle such as in a car or bicycle.

Additional Embodiments

The device may also include a leg strap that would essentially be a shorter (about 20 inch) version of adjustable strap 8 but with similar strap length adjuster means and strap attachment means. See FIG. 12. The leg strap would include two snap hooks or swivel snap hooks 6 (one on each end) and a strap adjuster 7. One swivel snap hook 6 would be clipped to the front D ring 4, the strap is passed between the child's legs, and the other swivel snap hooks 6 is clipped to the lower back D ring 4. This configuration would prevent a child from sliding out of the harness. The shoulder straps 1, waste piece 2, right back waste piece 9, and left back waste piece 10 could be designed in other styles without losing the functionality of the harness. FIG. 11 shows an alternative design where the shoulder straps 1 are extended to the bottom edge of the waste piece 2 in a deep V shape to form two front belt loops 3, by means of three stitching or other attachment points—one at the bottom of the V shape, and two at the top near the upper edge of waist piece 2. This and other variations in the design may be used to cut manufacturing costs. Besides the waist piece 2, other torso engaging means are possible, including a band, strap, belt, chain or rope around the hips, waist or chest. Such torso engaging means would have torso attachment means, including belt loops, rings or similar devices known to those skilled in the art. A shoulder engaging means could include, besides one or more shoulder straps attached to a waist piece, a solid or mesh vest-like or shirt-like structure. In addition to the adjustable strap 8 and leg strap 13, other elongate items could be used like rope, chain, strap, belt and similar items known to those skilled in the art. The core concepts comprising the securing structure of the present invention are various kinds of torso engaging means and the strap or other elongate members.

Alternative Embodiments

The device could also be made to fit and older child or a disabled adult with slight modifications. The purpose of the harness would be too lightly secure a mentally handicapped child or adult to a chair for a short period. For this purpose, the device would not include D rings 4 in the front or back, and the waist pieces 2, 9, and 10, would 16 be designed to closely resemble an adult piece of clothing such as a vest. The adult version may or may not include a hook and loop closure. The adjustable strap would be reconfigured slightly to resemble a belt (rather than a tether) so that it could be slid through belt loops 3 and 5 and secured around the spokes of the chair as shown in FIG. 2, or around the back of the chair as shown in FIG. 3. When the adult or older child is not sitting, the belt would simply stay in place around the waist secured by the belt loops.

CONCLUSIONS, RAMIFICATIONS AND SCOPE

A number of changes are possible to the device described above while still remaining within the scope and spirit of the invention. The specifics about the form of the invention described in this application are not intended to be limiting in scope. The scope of the invention is to be determined by the claims and their legal equivalents, not the examples given above.

I claim:

1. A harness adapted to be worn by a person having a torso, a chest and shoulders, comprising:
   (A) an elongated waist piece having a bottom edge and a top edge and including a first end portion with a first end, an opposite second end portion with a second end and a central portion therebetween, said first and second end portions including cooperative fastening elements operative to fasten together thereby to secure said waist piece around the torso of the person in a mounted state with said central portion confronting the chest of the person, said waist piece including a plurality of spaced-apart first connector elements disposed thereon proximately to the bottom edge thereof;
   (B) a pair of shoulder straps that extend across the shoulders of the person when in the mounted state, one said shoulder strap interconnecting said central portion and said first end portion and another said shoulder strap interconnecting said central portion and said second end portion, wherein said pair of shoulder straps are secured such that they cross one another at the back of the person when in the mounted state but do not cross one another when not in the mounted state; and
   (C) an elongated strap member having an adjustable effective length so as to define opposite strap member ends, said strap member including a fastener at each end thereof, each said fastener adapted to connect to said connector elements to selectively secure the ends of said strap thereto.

2. A harness adapted to be worn by a person having a torso, a chest and shoulders, comprising:
   (A) an elongated waist piece having a bottom edge and a top edge and including a first end portion with a first end, an opposite second end portion with a second end and a central portion therebetween, said first and second end portions including cooperative fastening elements operative to fasten together thereby to secure said waist piece around the torso of the person in a mounted state with said central portion confronting the chest of the person, said waist piece including a plurality of spaced-apart first connector elements disposed thereon proximately to the bottom edge thereof and a plurality of belt loops disposed thereon;
   (B) at least one shoulder strap interconnecting said central portion and one of said first and second end portions so as to extend across one of the shoulders of the person when in the mounted state; and
   (C) an elongated strap member having an adjustable effective length so as to define opposite strap member ends, said strap member including a fastener at each end thereof, each said fastener adapted to connect to said connector elements to selectively secure the ends of said strap thereto, wherein said belt loops are sized and configured to receive said strap member therethrough.

3. A harness adapted to be worn by a person having a torso, a chest and shoulders, comprising:
   (A) an elongated waist piece having a bottom edge and a top edge and including a first end portion, an opposite second end portion and a central portion therebetween, said first and second end portions having an end portion width as measured between said bottom and top edges and said central portion having a central portion width as measured between said bottom and top edges with the end portion width being about one-half of the central portion width, said first and second end portions including cooperative fastening elements operative to fasten together thereby to secure said waist piece around the torso of the person in a mounted state with said central portion confronting the chest of the person, said waist piece including a plurality of spaced-apart first connector elements and a plurality of belt loops disposed thereon;
   (B) at least one shoulder strap interconnecting said central portion and one of said first and second end portions so as to extend across one of the shoulders of the person when in the mounted state; and (C) said elongated strap member having an adjustable effective length so as to define opposite strap member ends, said strap member including a fastener at each end thereof, said fastener adapted to connect to said first connector elements to selectively secure the ends of said strap thereto, wherein said belt loops are sized and configured to receive said strap member therethrough.

4. A harness adapted to be worn by a person having a torso, a chest and shoulders, comprising:
 (A) an elongated waist piece having a bottom edge and a top edge and including a first end portion, an opposite second end portion and a central portion therebetween, said first and second end portions including cooperative fastening elements operative to fasten together thereby to secure said waist piece around the torso of the person in a mounted state with said central portion confronting the chest of the person, said waist piece including a plurality of spaced-apart belt loops disposed thereon and including a plurality of first connector elements disposed thereon, wherein there is a said first connector element associated with each of said belt loops;
 (B) at least one shoulder strap interconnecting said central portion and one of said first and second end portions so as to extend across one of the shoulders of the person when in the mounted state; and
 (C) an elongated strap member having an adjustable effective length so as to define opposite strap member ends, said strap member sized and configured to removeably engage said belt loops and including a fastener at each end thereof, said fasteners adapted to connect to each other and independently to said connector elements to selectively secure the ends of said strap thereto.

5. A harness adapted to be worn by a person having a torso, a chest and shoulders, comprising:
 (A) an elongated waist piece having a bottom edge and a top edge and including a first end portion, an opposite second end portion and a central portion therebetween, said first and second end portions including cooperative fastening elements operative to fasten together thereby to secure said waist piece around the torso of the person in a mounted state with said central portion confronting the chest of the person, said waist piece including a plurality of spaced-apart belt loops disposed thereon and including a plurality of first connector elements disposed thereon, wherein there is a central said belt loop located medially between said first and second ends and wherein there are intermediate said belt loops with there being one intermediate said belt loop element located intermediately between the central said belt loop and the first end of said waist piece and such that there is another intermediate said belt loop located intermediately between the central said belt loop and the second end of said waist piece;
 (B) at least one shoulder strap interconnecting said central portion and one of said first and second end portions so as to extend across one of the shoulders of the person when in the mounted state; and
 (C) an elongated strap member having an adjustable effective length so as to define opposite strap member ends, said strap member sized and configured to removeably engage said belt loops and including a fastener at each end thereof, said fasteners adapted to connect to each other and independently to said connector elements to selectively secure the ends of said strap thereto.

\* \* \* \* \*